United States Patent [19] [11] 4,273,138
Pauli [45] Jun. 16, 1981

[54] DISCHARGE ARRANGEMENT FOR AN AXIAL FLOW ROTARY SEPARATOR

[75] Inventor: Klaus H. Pauli, Bad Homburg, Fed. Rep. of Germany

[73] Assignee: Deere & Company, Moline, Ill.

[21] Appl. No.: 54,734

[22] Filed: Jul. 5, 1979

[30] Foreign Application Priority Data

Jul. 8, 1978 [DE] Fed. Rep. of Germany ....... 2830164

[51] Int. Cl.$^3$ .............................................. A01F 12/00
[52] U.S. Cl. .................................................. 130/27 T
[58] Field of Search .................. 130/27 T, 27 R, 27 H; 56/14.6

[56] References Cited

U.S. PATENT DOCUMENTS

| 4,056,107 | 11/1977 | Todd et al. | 130/27 T |
| 4,078,571 | 3/1978 | Todd et al. | 130/27 T |

Primary Examiner—Jay N. Eskovitz

[57] ABSTRACT

In an axial flow rotary separator, a rotor and a cylindrical housing are provided with material control elements so that, as is conventional, when the rotor is rotated, crop material in the annular space between rotor and housing is propelled downstream in a generally helical path. The lower portion of the downstream end of the wall of the cylindrical housing is notched or cut back to facilitate discharge of straw from the housing in a generally downward and rearward direction. The relief or notching of the lower portion of the cylindrical housing is defined by an "exit" edge extending helically upstream from the downstream extremity or edge of the cylindrical portion of the housing wall, from a point somewhat below the axis of the rotor and extending (circumferentially) around the lower half of the housing and up to approximately the level of the rotor axis on the other side of the housing, and by a horizontal "outlet" edge extending from the downstream extremity of the cylindrical wall portion upstream to meet the upstream end of the helical edge. The "notch" so formed is triangular shaped in its flat development. The transverse opening defined by the downstream end of the cylindrical housing may be left open or may be partially closed by a transverse bulkhead extending over an upper portion of the opening so as to limit the axially rearward or downstream movement of the discharged material. To facilitate the discharge and flow of material, a crop material cutter is optionally provided close to the junction between the horizontal outlet and helical exit edges of the discharge opening or notch in the housing wall.

10 Claims, 5 Drawing Figures

FIG. 2

DISCHARGE ARRANGEMENT FOR AN AXIAL FLOW ROTARY SEPARATOR

BACKGROUND OF THE INVENTION

The invention relates to axial flow rotary separators of the type which may be used in a combine harvester and particularly to an improved straw discharge arrangement for the downstream end of a cylindrical housing of such a separator.

The general mode of operation of such separators is well known. A rotor having an upstream threshing and a downstream separating portion extends axially through a generally cylindrical housing having a threshing gate or concave upstream and a suitably foraminous downstream separating portion, the rotor and housing cooperating as the rotor rotates to propel crop material received from a suitable upstream feeding device in an annular space between them generally downstream in a helical path while processing the material so that a portion of it is expelled through the threshing grate and foramina of the separator housing while the remainder, including straw, is discharged from within the downstream end of the separator housing.

It is generally desirable to control the straw discharge, at least to some degree, and typically to direct it downwards towards the ground. However, any interference with the free flow of material at the outlet end of the annular space may result in congestion with consequent increase or power consumption for the separator and reduction of separating capacity at the downstream end of the separator. A separator of the general type described above and a particular means for dealing with the straw discharge is disclosed in U.S. Pat. No. 3,863,643, DePauw. However, the method there disclosed has the disadvantage of requiring additional space as well as the cost of constructing the bulky "expansion chamber". Other known separator housing discharge treatments, for example those using transverse beaters, also incur penalties in increasing overall power consumption and sacrificing compactness for the benefit of achieving a particular material handling result.

SUMMARY OF THE INVENTION

An object of the present invention is to form a straw discharge opening for a cylindrical housing of an axial flow rotary separator in such a way that the throughput of crop material and the discharge of a straw mat can be achieved without congesting the rotating or stationary components of the threshing and separating apparatus. According to the invention, there is provided an axial flow rotary threshing and separating apparatus for a combine harvester having a rotatably mounted threshing and separating rotor which extends axially through a cylindrical and suitably foraminous housing and conveys crop material helically through the housing and discharges material remaining in the housing (principally straw) to the exterior by way of an outlet opening which is provided in the region of the downstream end of the housing, characterized in that the outlet opening is defined, at least partially, by an inclined exit edge of the housing wall and which intersects a transverse plane perpendicular to the axis of the threshing and separating housing at an angle. The exit edge can be substantially aligned with the direction of flow of the mat of crop material moving in a generally helical path through the separator housing, so that the discharge of the straw mat can be achieved without congestion and effective reduction of separator capacity or wasteful power consumption due to friction and recirculation of crop material. By virtue of this arrangement moreover, vibrations of the threshing and separating apparatus are substantially reduced.

It is preferable for the discharge opening to be defined at least partially by modifying the downstream end of the cylindrical housing wall to have an inclined exit edge and an intersecting outlet edge which extends parallel to the rotor axis. The exit edge may be made parallel to the helical direction of movement of the mat in the housing. The discharge opening in the housing wall may thus be of a triangular configuration in flat development. The separator housing may be closed or partially closed at its end by a transverse bulkhead contiguous with the unmodified portion of the downstream edge of the housing wall.

If the so called exit edge conforms closely to the helical material flow path, and especially if the end of the separator housing is partially closed by a transverse bulkhead as described above, then the bulk of the straw mat will (finally, and partially deflected from its helical path by the terminal bulkhead) emerge from the housing by crossing the so called outlet edge (which extends generally axially upstream from the housing end) and moving in a trajectory tangential to the housing wall at that point. A desirable dispersion of the discharge flow may be achieved by modifying the outlet edge to be inclined to the axial direction so that the tangential direction progressively changes along the length of the outlet edge. And, of course, the general direction of the discharge flow crossing the outlet edge may be selectively determined by the general disposition of the outlet edge. For example, if the outlet edge is below the separator longitudinal axis, and on the side of the separator where the straw mat is moving downwards (within the housing) then the discharge will be downwards and inwards (in relation to the separator centerline). Clearly the "notched" discharge opening defined by the intersecting exit and outlet edges may be located anywhere around the periphery or end of the separator wall.

In order further to facilitate the discharge of the straw mat, a severing and/or chaff cutting device may be provided in the region of the discharge opening, for example, in the region of the corner formed by the intersection of the outlet edge and the exit edge. The severing device may be in the form of a stationary knife or a rotary knife or a saw blade whose axis extends substantially parallel to the longitudinal axis of the separator housing or perpendicularly to the direction of flow of the crop material within the housing. When a cutting device is provided, it is preferable for the separator rotor to have an annular groove registering with the knife or saw blade and for one edge of the annular groove to be formed as a counter-edge which cooperates with the knife or saw blade.

DESCRIPTION OF THE PREFERRED EMBODIMENT

Figure 2:
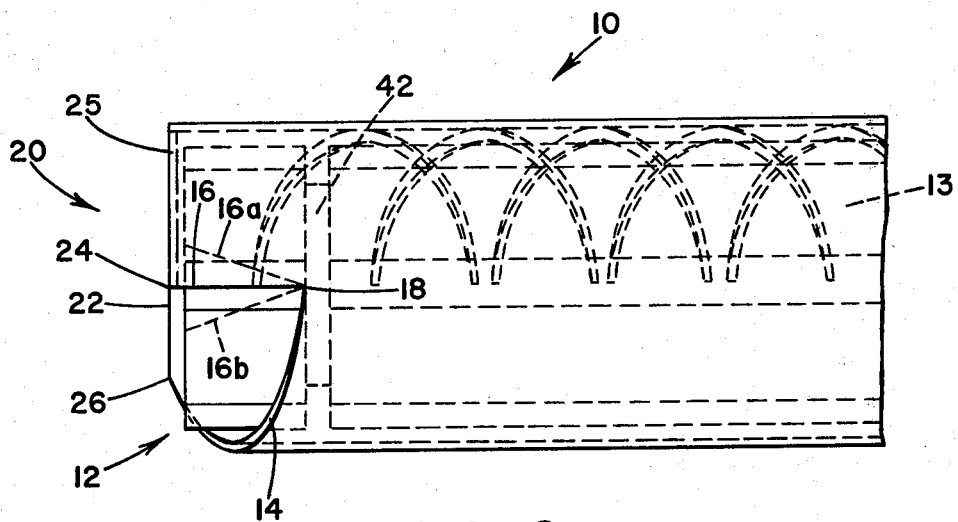
FIG. 2 is a side view showing the downstream portion of the separator housing and threshing and separating rotor.
Figure 4:
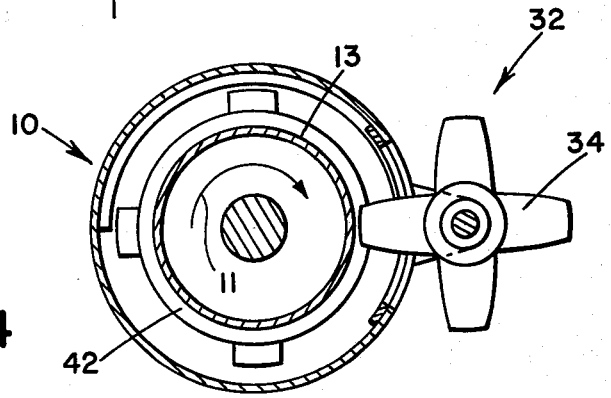
FIG. 4 is a partial view approximately on line 4—4 of FIG. 5 showing an optional severing device in the region of the discharge opening.

The invention is embodied in an axial flow rotary separator shown in semi-schematic side view in FIG. 2. It includes a separator housing 10 through which crop material is propelled in a helical path by a threshing and separating rotor 13, until it is discharged to the exterior by way of an outlet opening 12 disposed at the rearward or downstream end of the housing 10. At its downstream end, the separator housing 10 is open so that crop material can also issue in the axial direction. The rotor 13 and housing 10 are provided with threshing and separating bars and guide vanes respectively which are arranged so that the crop material is propelled helically through the housing 10 by the rotor 13 turning in the direction indicated by the arrow 11 in FIG. 4. Therefore, the main mass of crop material issues tangentially from the outlet opening 12 in the form of a mat, while a part of the crop material may also issue rearwardly and tangentially from the edges of the end opening of the housing.

The outlet opening 12 is defined partly by an inclined exit edge 14 which intersects a vertical plane transverse the housing 10. In addition, the outlet opening 12 is defined by an outlet edge 16 which extends parallel to the longitudinal axis of the housing 10 and which forms an intersection or corner 18 with the exit edge 14. The outlet edge 16 extends axially but may also be arranged so as to extend upwardly or downwardly at an inclined angle and may be a helical line as indicated by the alternate forms 16a and 16b in FIG. 2. The end 20 of the housing 10 has an end edge 22 which, with the outlet edge 16, forms a further corner 24.

Figure 1:
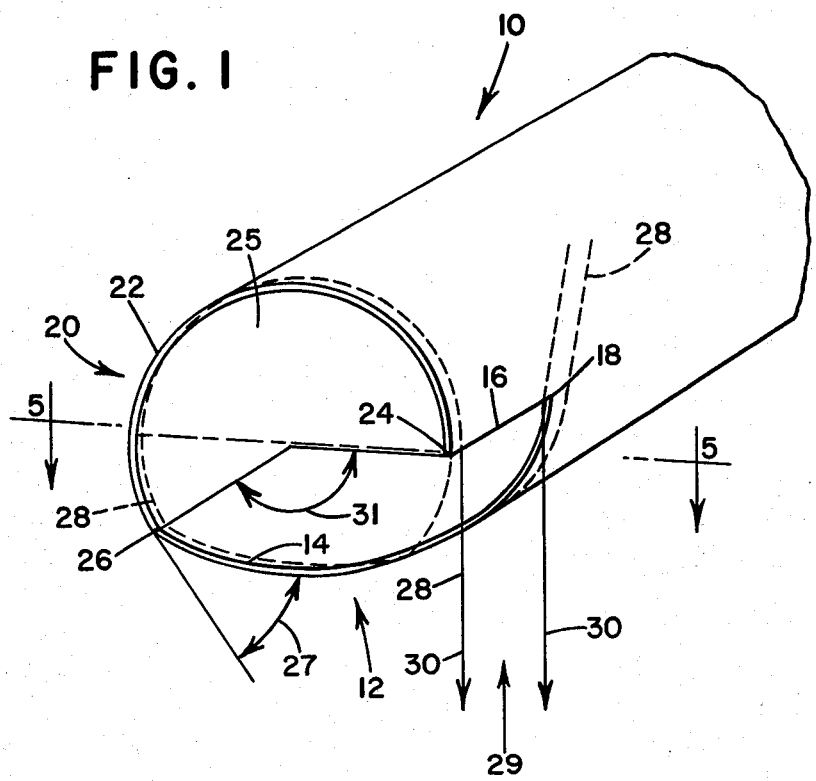
FIG. 1 is a diagrammatic perspective view of the downstream portion and outlet end of the separator housing with direction of crop material movement indicated.

In an alternate embodiment, the end 20 of the wall of the housing 10 may be partially closed by a bulkhead 25, indicated in phantom outline only in FIGS. 1 and 2.

Figure 3:
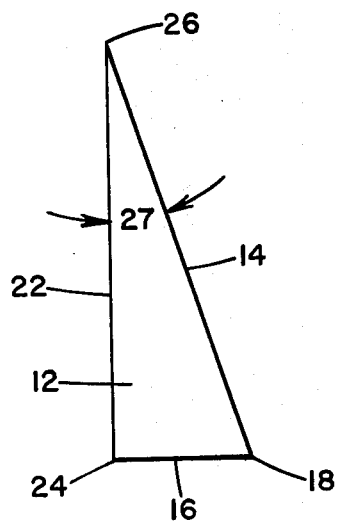
FIG. 3 shows the outlet or discharge opening of the separator wall in flat development.

The outlet edge 16 may be disposed substantially at the level of the axis of the housing 10 as shown. Approximately diametrically opposite the corner 24 is a vertex 26 of the separator wall outlet opening 12 which is of triangular configuration in development (FIG. 3). As can be seen particularly from FIG. 1, the exit edge 14 forms an acute angle 27 with the end edge 22 so that the exit edge 14 intersects the vertically extending transverse plane, at an acute angle. Because the helical characteristics of the separating bars and guide vanes cause the crop material or swath to be propelled through the housing 10 in a helix path 28 (FIG. 1), the crop material issues tangentially outwardly from the housing, by way of the outlet opening 12 and particularly from outlet edge 16. The tangential exit direction of the crop material or the swath, as indicated at 29, is illustrated by the two arrows 30. (The path of the material is shown in FIG. 1, as if the bulkhead 25 were in place.) At the outlet opening 12 of the cylindrical wall of the housing 10, the crop material mat can readily issue tangentially so that it is controlled more conveniently than when the crop material issues only from a plain end opening having only a circular peripheral edge similar to the edge 22. The outlet opening 12 subtends an angle 31 which may be about 180°. In this embodiment, the exit edge 14 extends substantially parallel to the helix 28 representing the direction of movement of the crop material or mat within the housing. By virtue of this arrangement and configuration of the outlet opening 12, the crop material can issue freely from the housing so that vibration and congestion effecting separating efficiency and power consumption are much reduced.

Figure 5:
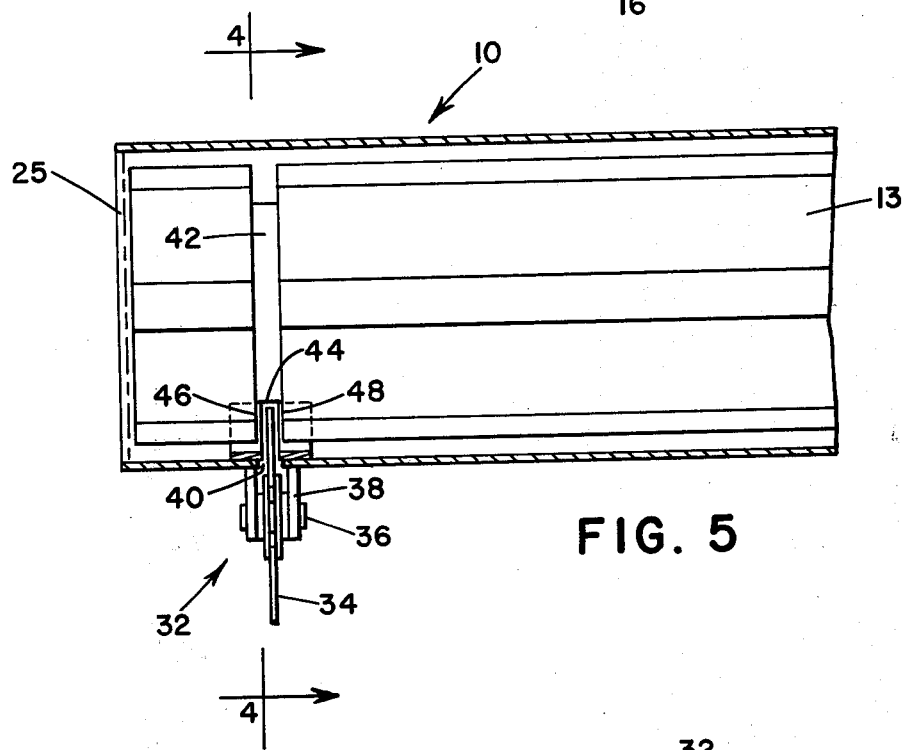
FIG. 5 is a partial view approximately on line 5—5 of FIG. 1 showing the relationship of the severing device to an annular groove in the rotor.

Disposed adjacent the opening 12, and preferably adjacent the intersection 18 of the outlet edge 16 and the exit edge 14, is a severing device 32 (FIGS. 4 and 5) which cuts up the crop material as it is about to leave the housing 10. The severing device 32 may also be in the form of a chaff cutting device which breaks up the crop material. As shown in FIG. 5, the severing device 32 is mounted at the corner 18 and comprises a stationary knife or a rotary knife or also a saw blade 34 which is secured on a rotatably mounted shaft 36 and which can be driven by a conventional drive means (not shown). The shaft 36 extends parallel to the longitudinal axis of the housing 10 and is secured to the outside of the housing by way of brackets 38. The housing 10 has a slot 40 for receiving the saw blade 34 so that the saw blade 34 may extend into an annular groove 42 which is provided in the rotor 13. The annular groove 42 comprises a bottom 44 and two sides 46 and 48. One side 48 forms the counter-edge for cooperating with the saw blade 34.

I claim:

1. In an axial flow rotary separator for a combine in which a generally cylindrical and at least partially foraminous separator housing wall surrounds a rotatably mounted threshing and separating rotor having a particular direction of rotation, in which housing and rotor cooperate as the rotor rotates to process crop material in an annular space between rotor and housing and convey at least a portion of that crop material in a generally helical path downstream for discharge from the separator, a discharge arrangement comprising an opening in the housing wall having discharge edges including an exit edge extending approximately in a helix lying in the housing wall and of the same hand as the helical path of the crop material being conveyed through the separator and having, in relation to the direction of rotor rotation, first and second ends.

2. The invention defined in claim 1 wherein the discharge edges also include an outlet edge extending approximately axially and downstream from the first end of the helically extending exit edge.

3. The invention defined in claim 1 wherein the discharge edges also include an outlet edge extending helically and downstream from the first end of the helically extending exit edge.

4. The invention defined in claim 1 wherein the helically extending exit edge is parallel to the helical path in which crop material is conveyed within the housing.

5. The invention defined in claim 1 wherein the discharge edges also include an outlet edge extending approximately axially and downstream from the first end of the helically extending exit edge and a generally transversely extending bulkhead edge defined by a bulkhead extending across and partially closing the downstream end of the cylindrical rotor housing.

6. The invention defined in claim 5 wherein the bulkhead, outlet and exit discharge edges together substantially define a downwardly and rearwardly directed separator discharge opening.

7. The invention defined in claim 2 and further including means for cutting crop material mounted adjacent the separator housing wall and disposed so as to engage and cut crop material at least partially within the discharge opening.

8. The invention defined in claim 7 wherein the cutting means is disposed closely adjacent the intersection of the outlet edge and the exit edge.

9. The invention defined in claim 7 wherein the cutting means includes a blade extending substantially transverse to the rotor axis.

10. The invention defined in claim 7 wherein the separator rotor includes an annular groove for registering with the blade of the cutting means.

* * * * *